3,087,828
NACREOUS PIGMENT COMPOSITIONS
Howard R. Linton, Scotch Plains, N.J., assignor to E. I. du Pont de Nemours and Company, Wilmington, Del., a corporation of Delaware
No Drawing. Filed June 28, 1961, Ser. No. 120,157
15 Claims. (Cl. 106—291)

This invention relates to new pigment compositions.

There are many types of pigments recognized in the prior art. Among such pigments, attention may be drawn to the opaque, high hiding power pigments typified, for instance, by titanium dioxide as a white pigment and by the various iron oxides as colored pigments. It is well recognized that the particle size of such pigments has a profound effect upon their value as pigments, as exhibited in the appearance of compositions in which these pigments are dispersed. Such pigments are generally composed of small irregular particles which behave as small spheres in their interaction with light. To achieve the optimum of opacity and hiding power, the particle size of such pigments is controlled to result in the maximum scattering of the incident light by coating compositions containing these pigments. It has been shown by both theoretical calculations and by practical tests that the light-scattering function increases as the diameter of the particle increases from about 0.1 micron to about 0.2 micron. At 0.2–0.3 micron, there is usually a maximum scattering and then, as the particle size increases further, a rather abrupt drop in scattering power.

Thus, the optical units of prior art high hiding colored and white pigments are generally particles of irregular shape, in the order of 0.2 to 0.3 micron in diameter, which refract and scatter light in substantially the same manner as spheres of very small size. A light beam which falls upon a surface pigmented with such optical units is refracted by each particle it encounters in a completely random manner, and the light is ultimately, in effect, reflected from the film in a random scattering. In the case of colored pigments, some of the wave lengths of light are absorbed so that the reflected light is composed of the remaining wave lengths of light and is thereby colored. In the prior art manufacture of such pigments, it has been a principal aim to maximize the random light scattering by control of particle size and shape.

Another class of pigments widely used in the prior art may be designated under the general term "flake pigments." In one of the oldest uses of such pigments, the flakes are used as reinforcing and protective pigments wherein the flake-like particles are oriented in a leafing or overlapping fashion, more or less parallel to the surface of the paint or other film, and thus create a physical barrier to the penetration of the film by deleterious agents as well as providing a reinforcing effect. Water-ground white mica in small sizes (200–325 mesh) has been widely used for this purpose. It is substantially colorless, and its refractive index (about 1.55) is essentially the same as that of the common paint vehicles; thus, it has a negligible effect on the visual properties of the film. However, when used in low refractive index vehicles or when partially exposed to the air, mica has a reflective and sparkling effect and has, on some occasions, been used for this effect.

Atwood, in U.S. Patent 2,278,970, has combined the reinforcing effect of mica with the high hiding power properties of other pigments, such as titanium dioxide, to give a composite pigment which is said to be an intimate association of mica with another pigment, exhibiting the general properties of the second pigment, but without the sparkling effect of the mica. In order to hide the sparkle of the mica and to obtain the general appearance of the second pigment, the particle size of this second pigment must be such as to result in a maximum, or a near-maximum scattering of light. In the case of titanium dioxide, particles in the range of 0.2–0.3 micron in diameter are necessary to achieve this result.

Other types of flake pigments include metal flakes, especially aluminum in various particle sizes, which have been used both for the purpose of reinforcing effects and for the essentially opaque character and shiny surfaces of such flakes, giving a film with the appearance of a metal surface.

Metal flake pigments, such as aluminum, have also found wide use because of their decorative effect, especially when mixed with other pigments, to give the well known "metallized" appearance of many automotive finishes. Despite their desirable appearance, such metallized finishes have certain well recognized defects, including a tendency to water spot, which is a persistent discoloration of the finish when water is allowed to stand on it in drops, especially when the water is slightly alkaline as from a detergent. It is also common to find that a mixture of aluminum flakes with a colored pigment is less lightfast than the colored pigment alone.

A third and more specialized use of certain flake pigments is to create finishes with a nacreous or pearl-like effect simulating the appearance of mother of pearl with its three dimensional effect of luster in the depth of the film. Pigments having this effect are non-opaque with a high refractive index and vary in nature from an extract of fish scales, essentially the organic compound gaunine, to flake-like crystals of certain inorganic salts, notably basic lead carbonate and lead acid phosphate. In spite of their valuable decorative properties, these products have well recognized deficiencies such as:

(1) They cannot, in general, be handled in dry form but must be stored and marketed as dispersions in the selected vehicles in which they will be used.

(2) Their lightfastness does not meet the demands of many outdoor uses.

(3) They are inherently very expensive to manufacture.

(4) The presence of lead compounds is frowned upon in many potential uses.

This invention provides a new group of nacreous flake pigments which can be marketed in a dry, easily dispersible form, which have excellent lightfastness, are generally non-toxic in character and relatively low in cost. They are capable of being formulated to give very desirable nacreous effects and, moreover, within the broad group, there are many products with pronounced color in addition to their nacreous character, the color being derived, at least in part, from the optical phenomenon of interference. Furthermore, these products may also be formulated to simulate a metallized appearance completely free from the water spotting so characteristic of finishes based on aluminum flakes. Finally, since they are flake-like in nature and chemically stable, they have the added ability to serve as reinforcing pigments.

All pigments exhibiting nacreous effects when dispersed in vehicles have certain common optical and physical characteristics which set them apart from the usual colored pigments and white pigments of commerce. In contrast to the irregularly shaped pigment particles described above, which behave optically much like small spheres, nacreous pigments are non-opaque flake-like products in which the optical units are extremely thin flakes, at least about 5 to 10 microns in major diameter and in the range of about 0.1 to 3 microns in thickness. Such optical units minimize the scattering of light and result in direct reflectance or sparkle.

Furthermore, all nacreous pigments must be transparent or translucent in character, and they must exhibit a substantial difference in refractive index from the medium in which they are dispersed. Thus, the common coating composition vehicles, plastics, and the like have refractive indices generally in the range of about 1.5 to 1.6. Those pigments which have been known in the prior art as nacreous pigments have, in general, refractive indices in the range of about 1.8 to 2.6. Most prior art nacreous pigments are thin flakes of a definite chemical compound. These thin flakes, in the presence of a vehicle of low refractive index, exhibit the optical behavior of thin films including light interference and a resultant interference color characteristic of the thickness of the film. However, the prior art flakes exhibit more or less random thicknesses, and the average effect is a blending of colors to give a nacreous or pearl-like appearance almost free of distinguishable color.

The optical principles which explain interference colors are well known and are discussed in many textbooks of physical optics such as Robert W. Wood, "Physical Optics, 3rd edition," New York, 1936, page 198. Briefly stated, interference is an optical phenomenon associated with the reflectance of light from the surfaces of thin films, wherein there is a reduction in the intensity of certain wave lengths of the incident light (destructive interference) and reinforcement of other wave lengths (constructive interference). The extent to which particular wave lengths are affected is dependent upon the thickness of the film and its refractive index. When the thickness is such that a ray reflected from one surface of a film is out of phase with a ray which has passed through the film and been reflected from the other surface, there is destructive interference.

Since there is a phase reversal when light is reflected from the surface of a medium of higher refractive index, the condition of maximum destructive interference (minimum reflectance) is satisfied when the effective optical path (thickness multiplied by refractive index) in a film of high refractive index in one wave length or a simple multiple thereof. Considering the refractive index, "N," of the film, the thickness ($t$) thereof for destructive interference with any wave length "$\lambda$" is given by the formula $$t = \frac{n\lambda}{2N}$$

where "$n$" is a small whole number usually not greater than 5.

By the same line of reasoning, if the two rays emerge in phase, there is reinforcement or a maximum of reflectance. This condition is satisfied, again assuming phase reversal, when the effective optical path is one half a wave length or an odd multiple thereof, the formula for the thickness at maximum reflectance being $$t = (n + \tfrac{1}{2})\frac{\lambda}{2N}$$

where "$n$" is 0 or a small whole number usually not greater than about 5.

When "$n$" is greater than 1, it is common to speak of the interference as a higher order, second order, third order, and the like. For thick films, there are interference bands at various wave lengths in the visible spectrum and the resultant colors are generally low in intensity.

It is now found that a thin, adherent, translucent layer of a colorless titanium or zirconium oxide of a selected small particle size can be deposited in a preferred oriented arrangement on the smooth surface of a translucent flake pigment, such as mica, to give a hitherto unknown family of slightly colored nacreous flake pigments which are relatively free from random scattering of light and which derive their color solely from the optical phenomenon of interference. It is further found that an additional adherent, translucent layer of a second metal oxide which may in itself be colored, can be deposited on, or intermingled with, the titanium oxide (or zirconium oxide) coated mica to give new products with an enhancement of color and improvements in other properties. When dispersed in a conventional manner as pigments in various systems, the compositions so obtained exhibit novel color effects, including a brilliant nacreous luster and, especially when viewed at the specular angle under bright illumination, as in the sunlight, they exhibit a striking iridescent sparkle on a background of a predominating color. When the oxide coatings are all inherently colorless, the observed color is solely the result of optical interference and varies in hue from a silver pearl through gold and red to blue and green as the thickness of the combined oxide layers increases. When a colored oxide is coated onto a titanium or zirconium oxide layer, both the inherent color of the second oxide and the interference color of the combined layers may be observed as a variety of spectacular effects.

The new nacreous flake pigments of this invention comprise two parts—(1) a non-opaque flake substrate, and (2) a thin, adherent, translucent layer of metal oxide of selected small particle size deposited thereon which metal oxide layer must include a layer of titanium oxide or zirconium oxide and may include a second oxide, either as a separate layer or in admixture with the titanium or zirconium oxide.

In a preferred embodiment of this invention, the non-opaque flake substrate is a flake-like micaceous mineral, usually muscovite mica, in a selected particle size range. Such flake substrates useful or the purposes of this invention are particles which have two dimensions (length and width) of similar magnitude and characteristically much greater than the third dimension. Specifically, the preferred flakes of this invention are at least about 5 to 10 microns in a major dimension and in the range of about 0.05 to 1.0 micron in thickness. For most pigment purposes, the upper limit in the major dimension is from 50 to 100 microns. However, for specialized uses such as in plastic articles of appreciable thickness, linoleum, and the like, larger flakes up to as much as 1 mm. length may be used for special decorative effects. The lower limit in thickness of the mica flake is determined to a large extent by the physical strength of the flake and may be as little as 0.05 micron or even less, while an upper limit of about 3.0 microns, accompanied by a correspondingly greater length and width, is fixed by the effect on the coating composition surfaces. Such flakes must also be substantially planar with a relatively smooth and light reflecting surface and must be insoluble in either water or organic solvents and inert thereto.

A satisfactory grade of mica is a water ground white mica, frequently used as a reinforcing extender pigment in paint, all of which passes through a 200 mesh screen and about 90% through a 325 mesh screen. A mica pigment meeting ASTM specification D–607–42 is a preferred grade. However, for specialized purposes, it is quite possible to use flakes which are in the 140 mesh to 200 mesh range on the one hand as well as material which is considerably finer, approaching the 400 mesh size or even finer.

Another measure of particle size, more readily correlated in many ways with the application of the subsequent metal oxide film to the surface, is the specific surface area as measured by gas adsorption using the well-known BET method. This function has been found to vary appreciably from batch to batch of nominally similar sized micas. Mica with a surface area of about 3 square meters per gram and with a reasonably uniform particle size is a particularly suitable form. However, products of acceptable properties may be obtained from samples of mica with widely differing surface areas provided appropriate adjustments are made in the amount of metal oxide applied to form the transparent layers thereon so that the use of metal oxide per unit of surface area is appropriately controlled. No arbitrary limits on surface area can be established, but a range from about 2 sq. meters per gram to about 7 sq. meters per gram will encompass the products most likely to be desired.

In addition to the preferred muscovite or white mica, other forms of mica such as biotite, phlogopite, related vermiculite, and various synthetic micas, especially those which resemble natural white mica, may be used as substrates in this invention. To obtain these products in the desired particle size ranges, it is preferred that they, also, be water ground. The introduction of agents to facilitate exfoliation or the introduction of other inert coatings which do not materially alter the refractive index of the mica nor its receptivity to the subsequently applied translucent layer of titanium oxide are contemplated as being with the scope of this invention. The inherent color of some of these micas influences the color of the final products, but the interference colors of the films deposited will still be present.

The preferred material for the thin translucent layer of metal oxide deposited upon the mica substrate is an oxide of tetravalent titanium, such as $TiO_2$, the particles of which are less than about 0.1 micron in diameter. Such a layer of $TiO_2$, as the hydrous oxide, is conveniently deposited upon a mica substrate by suspending the mica in a dilute, strongly acidic solution of titanyl sulfate at ambient temperature and then hydrolyzing the titanium sulfate solution by rapidly heating to about 90–100° C. and maintaining at that temperature for about 2–3 hours so that the hydrous titanium dioxide as formed is continuously deposited on the mica with a minimum of formation of free hydrous titanium dioxide. Alternately, the mica may be suspended in hot water to which is then rapidly added a strongly acidic concentrated titanyl sulfate solution, after which hydrolysis and deposition of the hydrous titanium dioxide on the mica are brought about by continued heating at the boil until hydrolysis is complete. The choice between these methods is a matter of convenience.

Upon isolation of the resulting pigments by filtration and drying, there are obtained nacreous powders exhibiting brilliant interference colors when dispersed in a vehicle, the predominating color depending (at least in part) upon the thickness of the hydrous oxide film.

The color of the products obtained in this manner is rather subtle and is most readily observed when a film containing these new nacreous pigments is observed over a dark background. In addition to the predominant interference color, substantially all of these products show a brilliant iridescence or a multicolored sparkle when observed at the specular angle under bright illumination, as in the sunshine. This combination of iridescence on a background of a predominating color is an outstanding characteristic of the new products.

The new products containing hydrous $TiO_2$ on mica, as directly prepared by the hydrolysis of a titanyl sulfate solution in the presence of mica, although very beautiful in color effects and useful for some purposes where not generally exposed to light, are quite photosensitive, showing marked changes in pigmented compositions containing them on exposure to light. Consequently, they require stabilization in this property for their most effective uses. This photosensitivity is believed to derive in part from either one of two causes. On the one hand, dry hydrous $TiO_2$ invariably contains an appreciable amount of acidic impurities which cannot be removed by the usual techniques of isolation of the pigment. Partial stabilization to sensitivity from this cause can be brought about by the deposition of certain other metal oxides, particularly hydrous alumina or hydrous chromic oxide, upon the layer before final drying. More effective stabilization is, however, brought about by calcination at temperatures in the range of 700–1000° C., preferably in the 900–1000° C. range. Products obtained by calcination in these temperature ranges retain their brilliant interference colors to a large extent, although the predominant colors shift slightly in the direction which indicates a reduction in the thickness of the layer of oxide, as would be expected by the driving out of certain impurities, including water and residual acid.

It is well known in the art that certain impurities have a profound effect on light sensitivity of titanium dioxide. This effect is also found in the pigments of this invention. For instance, very small amounts of iron which may be introduced through the use of impure raw materials or by migration from the mica during calcination are found to cause light sensitivity to increase. On the other hand, certain impurities may be deliberately introduced by the proper selection of raw materials or the addition of appropriate salts to the titanyl sulfate solution to bring about remarkable improvements in reducing photosensitivity. Compounds of antimony, miobium, chromium, tungsten, molybdenum, and even iron when used in substantial amounts, serve in this way. An especially valuable procedure is to add small amounts of an antimony compound, for instance, antimony oxide (in the range of 0.5 to 5%, preferably about 2%, based on titanium dioxide present) prior to the calcination. In any case, small amounts of a second metal oxide, not exceeding about 20% by weight of the titanium oxide, may be included in the titanium oxide layer, either as an impurity or by deliberate coprecipitation.

An alternative procedure for depositing the film of titanium dioxide involves the exposure of hot ($\pm 600°$ C.) flakes of mica to the vapor of an organic titanate ester such as tetraisopropyl titanate in the absence of air or water vapor, and preferably in a vacuum. Likewise, other water-soluble salts of titanium may be used in the hydrolysis procedure. Thus, in particular, titanium oxychloride can be used on the one hand, as can certain water-soluble titanium esters such as titanium acetyl acetonate and triethanolamine titanate on the other hand.

Furthermore, a zirconium dioxide coating can be used in place of the titanium dioxide coating. It may be applied in a similar manner, and in similar amounts, by the hydrolysis of a solution of a suitable zirconium salt (zirconium oxychloride or zirconium sulfate, for instance) in the presence of mica. It is a peculiarity of anhydrous zirconium oxide that it has a significantly lower refractive index than hydrous titanium oxide so that the products containing the simple layers of hydrous zirconium oxide are appreciably less nacreous in character than products containing titanium oxide. However, upon calcination, a pronounced nacreous character is developed.

It is also contemplated that a second layer of metal oxides may be deposited on top of, or intermingled with, the titanium oxide or zirconium oxide layer. This second layer may consist of colorless oxides such as alumina, zirconium oxide, zinc oxide, tin oxide, antimony oxide and the like, or even a second layer of titanium oxide. On the other hand, it may include oxides which have inherent color such as iron oxide, nickel oxide, cobalt oxide, copper oxide, or chromium oxide. This second layer of oxide obviously alters the thickness of the total oxide layer, and thus contributes to the interference phenomenon. It may also contribute inherent color of its own, together with the interference color, giving largely unpredictible tinctorial effects of great interest.

The titanyl sulfate solution used in the preferred processes may be obtained in any convenient manner. Thus, a relatively pure titanyl sulfate may be obtained by dissolving in sulfuric acid a hydrous titanium oxide precipitate commonly obtained as an intermediate in the preparation of $TiO_2$ pigment. However, it has been found that such highly pure solutions are not necessary and that equivalent results can be obtained by using a conventional titanyl sulfate concentrate prepared from the ore and containing a small amount of iron which is maintained in the divalent state by the presence of a small amount of trivalent titanium in the strongly acid solution. Thus, the concentration of the titanyl sulfate in the aqueous solution may vary over a range, say, preferably from about 2 parts (calculated as TiO$_2$) to about 20 parts per 100 parts of solution. Regardless of the concentration, it is necessary that there be free acid in the solution at all times over and above that necessary to convert all of the titanium oxide to TiOSO$_4$. This is necessary to prevent precipitation of a hydrous titanium oxide at room temperature. The titanium oxide art conventionally uses a "factor of acidity" (F.A.) as a parameter to define this relation where, $$F.A. = \frac{100 \text{ (total acid - combined acid)}}{\text{Combined acid (TiOSO}_4\text{)}}$$

In the examples below, F.A. values of about 80 for a concentrated titanyl sulfate solution and about 220 for a more dilute titanyl sulfate are shown. Values in the range of about 50 to 300 are preferred for the best results. The critical condition is that there be sufficient acid to prevent hydrolysis at room temperature but not sufficient to repress hydrolysis excessively at elevated temperatures. The desired conditions will obviously vary somewhat with concentrations of reactants and with temperature and, within within a broad range, the conditions may be readily determined by the skilled worker. In general, the preferred F.A. values are within the range considered optimum for the preparation of pigment-grade TiO$_2$.

Regardless of the source of the titanyl sulfate and regardless of the concentration in the starting material, the concentration of the titanium salt in the solution in which the mica is suspended at the point of hydrolysis is more dilute by a factor of at least 2 or 3 than is preferred for TiO$_2$ pigment. For the best results in this invention, this concentration of titanium salt (calculated as TiO$_2$) in the solution at the point of precipitation should be at least about 2 parts and should not exceed about 7 parts per 100 parts of solution.

The amount of the titanium (or zirconium) salt used in relation to the mica may vary over a wide range and is significant only as a control on the thickness of the ultimate oxide coating. In general, the usage, calculated as TiO$_2$ (or ZrO$_2$), should be in the range of about 10 parts per 100 parts of mica (about 10%) up to as much as about 200 parts per 100 parts of mica (about 66%) with a preferred range for TiO$_2$ of about 15 to 80 parts per 100 parts of mica (about 15–40% of TiO$_2$). This is, of course, reflected in the thickness of the layer deposited and the resulting interference color. It has been found that when the amount of TiO$_2$ is in the range of 10–26% by weight of the product, a silver-colored pigment is usually obtained; in the range of 26–40%, the pigment is golden in color; and in the range of 40–50%, the color of the pigment varies from red to blue to green as the trickness of the metal oxide layer is increased. In the range of 50–50%, higher order interference colors are obtained. Other means have also been used in this invention to correlate thickness of film with interference color. For example, a convenient measure of the thickness of the layer is the weight of TiO$_2$ deposited per unit area of mica surface (conveniently expressed as milligrams per square meter of mica surface) and this may vary from about 50 mg. of TiO$_2$ to 600 mg. of TiO$_2$ or more per square meter of surface. In the upper portions of this range, the observed colors are higher order interference colors. The relation between the weight of TiO$_2$ per square meter and the color varies somewhat between uncalcined and calcined products. However, within broad limits, the following table sets forth the correlation between the observed interference colors and the measured TiO$_2$ weight per square meter of mica surface. Since color hues vary continuously over the spectrum, it is obvious that the ranges merge at the dividing points. Pigments having 50–280 milligrams of TiO$_2$ per square meter of mica surface exhibit first order interference colors, and they are preferred materials.

| Color: | Mg. TiO$_2$ per square meter |
|---|---|
| Silver | 50 to 100 |
| Gold | 100 to 180 |
| Red | 180 to 220 |
| Violet | 220 to 240 |
| Blue | 240 to 260 |
| Green | 260 to 280 |
| 2nd order gold | 280 to 350 |

The weight of ZrO$_2$ per square meter will be somewhat larger than these figures because of the higher density. The general principles, however, apply.

Another means for measurement of the thickness of the TiO$_2$ layer in relation to the color, which depends upon direct measurement and not upon prior knowledge of the nature of the mica or the TiO$_2$ coating, is derived from the wave lengths of the interference bands using the formulas given above in the discussion of interference. The wave lengths of the interference bands can be readily determined from spectrophotometric curves made in the conventional manner on dispersion of the colors over black backgrounds. From these measurements of wave length, optical paths can be calculated (½ of the wave length of the first order minimum or ¼ of the wave length of first maximum), and it follows that the optical path divided by the refractive index gives a calculated thickness which varies with the color as defined in the spectrophotometric curves. It is well known that the refractive index of TiO$_2$ varies with the wave length (see Schroeder-Zeit. für Kristallographie 67, 485–542 (1928)), and, in the table which follows, allowance for this variation has been made in calculating the thickness. Since the coatings are known to be particulate (based on electron micrographs) and contain voids, the correlation between this calculated thickness and a calculated thickness based on the known weight of TiO$_2$ per unit area and the specific gravity of the TiO$_2$ must make allowance for these voids as well as for some possible unevenness of coating on all of the surfaces of the mica measured by the BET method. Making reasonable allowances for these factors, the correlation is excellent.

In the following table, the optical path has been calculated from measurements of interference bands exhibited by typical products of known composition. Where possible, interference bands, either maxima or minima, falling in the visible portion of the spectrum have been used for the calculation. The silver flakes, however, have no interference bands in the visible spectrum and there is considerable uncertainty about the exact position of the interference band in the ultraviolet because of an absorption band of TiO$_2$ in the same region. Measurements of thickness are in millimicrons. Weight of TiO$_2$ per square meter is in milligrams, and they are based on direct measurements.

| Color | Optical path (in millimicrons) | Geometric thickness (in millimicrons) | TiO$_2$ per square meter (in milligrams) |
|---|---|---|---|
| Silver | [1] 96 | [1] 35 | 85 |
| Pale gold | 150 | 59 | 145 |
| Gold | 175 | 71 | 163 |
| Red | 250 | 95 | 186 |
| Violet | 297 | 117 | 231 |
| Blue | 325 | 129 | 250 |
| Green | 358 | 145 | 275 |
| 2nd order gold | 412 | 161 | 320 |
| 2nd order violet | 487 | 194 | 385 |

[1] Estimated.

From these illustrative data, it is apparent that products of technical merit are found throughout a range of about 30 to 200 millimicrons in the calculated geometric thickness of the oxide layer. It has been found in other studies that a broader range of about 20 millimicrons to about 250 millimicrons is also useful with the range of about 20–155 millimicrons for the first order interference colors as preferred.

The following table gives the color obtained within various ranges of thickness.

| Color: | Geometric thickness range (in millimicrons) |
|---|---|
| Silver | 20–40 |
| Pale gold, gold | 40–90 |
| Red | 90–110 |
| Violet | 110–120 |
| Blue | 120–135 |
| Green | 135–155 |
| 2nd order gold | 155–175 |
| 2nd order violet | 175–200 |

The thickness of a $ZrO_2$ layer may vary to a small degree from the figures given above, since $ZrO_2$ has a slightly lower refractive index.

The isolation of the pigments of this invention by filtering, washing, and drying is entirely conventional. However, it is well known that a certain amount of sulfate ion is very tenaciously held by a hydrous titanium dioxide precipitate, and it is sometimes desirable to favor the more complete removal of this sulfate by washing with a dilute alkaline solution such as dilute ammonium hydroxide, either on the funnel or by reslurrying in such a solution, followed by filtering and washing again.

It appears that one of the critical features distinguishing the new products from the titanium dioxide pigments of the prior art lies in the character of the titanium oxide deposited on the mica flakes. Examination of such flakes, both before and after calcination, in the electron microscope, suggests that the hydrous oxide film has particles so small as to be very poorly resolved in the electron microscope. They are not completely non-crystalline because they have a distinguishable X-ray diffraction pattern and there is some evidence of very small, in the order of 0.01 micron in size, particles, but these particles do not appear to have sharp edges and tend to be irregular in size and shape. Upon calcination, a definite crystalline pattern becomes evident but the crystallites are still extremely small and densely packed so that the optical character is that of a film. Measurement of these particles shows a maximum particle size of about 0.1 micron for any calcination temperature below about 1000° C. In the preferred calcination temperature range of from about 700 to about 1000° C., substantially all of the particles are appreciably less than 0.1 micron in diameter. At higher temperatures, some larger particles do appear and when the particles of $TiO_2$, or other oxide, substantially exceed 0.1 micron in diameter, the interference colors and the nacreous character of the product are no longer apparent. Such products exhibit the light-scattering properties of conventional $TiO_2$ or other pigments.

In the deposition of a second metal oxide layer, it may be deposited upon either a hydrous titanium or zirconium oxide layer or upon the corresponding calcined layer or it may be deposited simultaneously with the titanium oxide layer by adding an appropriate metal salt to the titanyl sulfate solution. In general, the second oxide is deposited in a lesser amount than either the titanium or zirconium oxide. One of the most outstanding results from the deposition of such a second metal oxide is a marked stabilization of the photosensitivity of the initial hydrous $TiO_2$ layer. Alumina hydrate lends itself admirably for this purpose. This material has a relatively low refractive index, and it produces stabilization with a relatively minor effect on the color of the interference. It is most effectively deposited as a second layer by thermal hydrolysis from a buffered solution such as aluminum acetate.

Other oxides which may be deposited include the following:

(1) Zinc oxide (ZnO) may be deposited by thermal hydrolysis of an ammoniacal zinc complex solution such as tetrammine zinc sulfate. When such a combined layer of hydrous $TiO_2$ and ZnO is calcined, the resulting layer exhibits the X-ray pattern of rutile $TiO_2$ whereas the single layers of $TiO_2$ show anatase $TiO_2$. In general, this variation appears to have a minor effect on the properties of the coated flakes.

(2) Zirconium oxide ($ZrO_2$) may be deposited as the hydrous oxide on top of hydrous $TiO_2$ by the thermal hydrolysis of a solution zirconium oxychloride, for instance. It improves the stability to light with a minor effect on color. On calcination of the combined layers, however, there is an increase in refractive index which results in a color effect to be anticipated from a thicker film.

(3) An iron oxide layer ($Fe_2O_3$) may be deposited by the thermal hydrolysis of a solution of ferric acetate, for instance. The resulting product, prior to calcination, is a brilliant gold flake pigment of pronounced color which varies with the thickness of the combined layers and is accompanied by an iridescent sparkle. Such pigments impart a pronounced two-tone effect to compositions containing them. On calcination, there is a color change toward the red, in line with the known behavior of iron oxides, retaining to a large extent, however, the nacreous effect.

(4) Nickel oxide is readily deposited on a hydrous $TiO_2$-coated mica by the thermal hydrolysis of a nickel tetrammine sulfate solution, for instance. The color effects in this case after calcination, as shown in Example XV are quite unexpected.

Nickel oxide may also be deposited by thermal hydrolysis of a nickel acetate solution.

(5) Cobalt oxide is readily deposited by the thermal hydrolysis of a cobalt acetate solution.

(6) Some of the most unexpected effects are obtained with chromium oxide ($Cr_2O_3$). It is deposited readily by the thermal hydrolysis resulting from the volatilization of ammonia from a solution in water of hexammine chromium (III) derivative or by the thermal hydrolysis of a chromium salt solution, buffered with borax. A very thin layer (1% to 2% of $Cr_2O_3$ based on the $TiO_2$) deposited on a hydrous $TiO_2$ layer has resulted in marked stabilization of the photosensitivity with very little effect on the color of the pigment. Moreover, this thin layer of chromium oxide seems to stabilize the color on calcination so that such products are improved both in color and in stability to light over untreated products.

If, on the other hand, a large amount of $Cr_2O_3$ (5–15% based on the $TiO_2$) is deposited, for instance, on top of a hydrous $TiO_2$ with a gold interference color and the resulting flake pigment calcined, the final product is an attractive golden nacreous pigment with an iridescent sparkle which imparts an interesting two-tone effect to compositions pigmented therewith.

It is obvious that other metal oxides not specifically mentioned, can be incorporated into these flake pigments in like manner.

The above illustration with chromium oxide points to the importance of variations in the thickness of the successive layers in multilayer coatings. The amount of titanium oxide or zirconium oxide in the initial layer may vary over the whole range shown for the single layer. The resulting colors will significantly affect the properties of the final products. In like manner, the second layer may be varied in thickness by controlling the amount of reagent used and the conditions of deposition. The thickness of the second layer contributes to the interference color in the expected manner, subject to variations in the refractive indices. The invention contemplates ranges in the individual layers of the multilayer coating comparable to those shown for $TiO_2$ alone.

It is quite apparent that the deposition of successive layers of metal oxides can be extended beyond two successive layers and the invention should be understood as contemplating such multilayer coatings. It is also contemplated that thick layers of titanium oxide may be deposited in a single step or may be deposited in successive steps with or without a calcination step between.

In discussing the properties of these new pigments, emphasis has been placed on compositions in which they are used alone. It has been pointed out, however, that the color is most readily observed over dark backgrounds. It is also possible to develop similar effects by mixtures with other pigments. Thus, mixtures with carbon black can be formulated to give effects very similar to those obtained by lamination over a black surface. In mixtures with colored pigments, the nacreous character, and frequently the sparkle as well, are retained while the effect on the color is often far greater than might be anticipated from the relatively subtle color of many of the flakes alone. Many combinations have an effect not unlike that of aluminum flakes except that the proportions of the new flakes to the color can be much higher than when aluminum flakes are used since the new flakes are more transparent than the metal flakes.

When the new flakes are used in admixtures with conventional pigments of high hiding power, such as pigmentary $TiO_2$ for instance a pronounced nacreous, or pearl-like, character is quite evident even with as much as 25 to 50% of $TiO_2$, but the iridescent sparkle may be very much diminished. Nevertheless, such mixtures offer attractive possibilities to the formulator.

An outstanding property of the new flake pigments is their remarkable ease of dispersibility in coating composition vehicles. It has been considered necessary with substantially all pigments known to the art to subject them to considerable grinding action for the necessary degree of dispersion required in formulating high quality paints, enamels, and the like. $TiO_2$ requires substantial grinding to give acceptable enamels. Mica also requires considerable work on the system for good dispersion. It is, therefore, totally unexpected to find that the new pigments, whether calcined or not, can be dispersed in a great variety of vehicles by simple vigorous agitation. Additional grinding shows little, if any, advantage and can be easily carried to the point where the flakes are broken with an undesirable effect on the color obtained.

Although these new pigments are spoken of as exhibiting interference colors of specified hues in the examples which follow, these colors are often very subtle and are best observed under certain specific conditions. Thus, many of the powders in bulk show little color, being almost white or slightly yellowish. If the powder is spread in a thin film such as by rubbing between the fingers, and observed in a bright light, it shows a pronounced sparkle and definite color. If it is mixed with water on a black surface, the color and sparkle immediately become visible.

Such pigments have their principal value as ingredients of compositions such as points, printing inks, plastic films, rubber articles, and the like to which they impart color and other decorative effects and often exert a profound influence on the durability of such compositions on exposure to the elements. When the color and decorative properties of pigments are spoken of, it is generally understood that reference is being made to compositions containing the pigments of which the following are typical, but not limiting.

FORMULATION A.—UNSUPPORTED FILM OF CELLULOSE ACETATE 1.0 part of pigment is added to 20 parts of a cellulose acetate solution containing 16.7% cellulose acetate in acetone. The mixture is stirred until thoroughly mixed. A glass plate is prepared for stripping a film therefrom by coating the clean plate with a silicone stopcock grease and then wiping thoroughly with a dry cloth. The lacquer is spread on the glass plate and drawn down to a wet film thickness of about 0.16 mm. After the solvent has evaporated, the film is stripped from the plate and observed on the smooth side. Such films are conveniently used for light-fastness tests in a "Fade-Ometer."

FORMULATION B.—BAKED ACRYLIC LACQUER

| | Parts |
|---|---|
| Pigment | 2.5 |
| Mixed acrylic ester polymer ("Acryloid" A–101, Rohm and Haas) | 17.9 |
| Butyl benzyl phthalate | 7.7 |
| Mono-acetate of ethylene glycol monoethyl ether | 20.0 |
| Methyl ethyl ketone | 56.9 |
| Toluene | 50.0 |

The pigment is dispersed by vigorous stirring with the resin and plasticizer together with a portion of the solvents for about 15 minutes; the remainder of the solvents is then added and the mixing continued until uniform. Exhibits are prepared by spraying onto primed panels and, after drying, baking at 80–85° C. for 20 minutes. Alternatively, as a quick testing method, films of this lacquer may be spread to uniform thickness with a "doctor blade" and observed after air drying.

FORMULATION C.—BAKED ALKYD ENAMEL

| | Parts |
|---|---|
| Pigment | 2.5 |
| Non-oxidizing coconut oil-modified alkyd resin solution (60% solids) | 29.2 |
| Modified melamine formaldehyde resin (55% solids) | 13.6 |
| Aromatic hydrocarbon solvent | 15.0 |
| Aliphatic hydrocarbon solvent | 19.0 |

The pigment is added to the mixed resin solutions with a part of the solvent and dispersed by high speed stirring for about 15 minutes after which the remainder of the solvent is stirred in. The resulting enamel is sprayed onto a primed metal panel and baked one half hour at about 120° C. Films of uniform thickness may also be applied with a "doctor blade."

FORMULATION D.—VINYL PLASTIC FILM

| | Parts |
|---|---|
| Pigment | 3 |
| Vinyl chloride polymer | 100 |
| Dioctyl phthalate | 40 |
| Polyester resin | 10 |
| Stabilizer (barium-cadmium-zinc phosphite) | 3 |
| Stearic acid | 0.25 |

The pigment is added to the mixture of ingredients and the whole mixture is processed on a two roll mill, heated to 155° C., until uniform. It is finally taken from the mill as a sheet of any desired thickness which may be observed as obtained or may be press polished in a suitable heated press.

These compositions are all conventional and may be modified in well-known ways or may be replaced by equally conventional compositions including cellulose nitrate lacquers, linseed or other oleo resinous varnishes, linoleum compositions, rubber, polyethylene resins and the like.

In all cases, as previously pointed out, the observed color can be confirmed by optical measurements such as spectrophotometric reflectance curves which can be determined by measurements on dispersions of the colors over black backgrounds.

Such measurements give reflectance curves which conform to the observed color. Where the oxide coating is inherently colorless, there is a progressive shift to longer wave lengths for the reflectance minima as the thickness of the coating increases. For instance, in a series of samples with increasing amounts of $TiO_2$ in a single coating, the wave lengths of the minimum and maximum reflectance values for typical samples vary with the color as follows:

WAVE LENGTH OF 1st INTERFERENCE BAND

| Color | Minimum | Maximum |
| --- | --- | --- |
| Silver | In the ultraviolet | About 390 millimicrons. |
| Gold | 390 millimicrons | 700 millimicrons. |
| Red | 500 millimicrons | 970 millimicrons. |
| Violet | 570 millimicrons | 1,100 millimicrons |
| Blue | 600 millimicrons | 1,170 millimicrons. |
| Green | 685 millimicrons | 1,350 millimicrons. |

WAVE LENGTH OF 2nd INTERFERENCE BAND

| | | |
| --- | --- | --- |
| Gold (2nd order) | 430 millimicrons | 550 millimicrons. |
| Violet (2nd order) | 500 millimicrons | 650 millimicrons. |

When a multilayer coating contains an oxide which is inherently colored, the spectrophotometric curve shows both the absorption bands of the inherent color and the interference bands due to the thin film on the translucent flake pigments.

The following examples illustrate but do not limit the invention. In all cases, unless otherwise specified, all parts refer to parts by weight.

*Example I*

580 parts of an aqueous titanyl sulfate solution containing 4.4% $TiO_2$ as titanyl sulfate (equiv. to 25 parts $TiO_2$) and F.A. of 217 is diluted with 500 parts of water. 100 parts of mica is then suspended in this solution. The mica is a water-ground white mica (muscovite) having the trade name "Concord Wet Ground Mica #200/325." This mica has a specific surface area of about 3.3 square meters per gram, as determined by krypton adsorption in the previously mentioned BET Method; it all passes through a 200 mesh screen and about 94% through a 325 mesh screen. The average particle size is in the range of 20–40 microns in maximum dimension and about 0.1 micron in thickness. The suspension of mica in the titanyl sulfate solution is heated rapidly (about 10 minutes) to the boil and maintained at the boil under reflux for about 2½ hours. The product is isolated by filtering and washing with water to a pH of 5.0. After drying at 80° C., there is obtained about 135 parts of a finely divided flake pigment which requires no further particle size reduction. In bulk form, this flake pigment is a shiny, slightly yellow powder. It may be readily dispersed in various coating composition vehicles by simple high-speed stirring. When dispersed in an alkyd resin vehicle as in Formulation C and coated over a black, primed metal surface, the resulting surface has a silvery appearance and a lustrous iridescent sparkle in the sunshine.

*Example Ia*

This portion of the example illustrates how a change in color can be obtained by using a larger amount of titanyl sulfate solution, thus depositing a thicker layer of hydrous $TiO_2$.

If the procedure of Example I is followed except that the amount of titanyl sulfate solution is increased to 1160 parts (50 parts $TiO_2$), the yield of flake pigment is about 150 parts of shiny powder with a slightly more yellowish tinge. When dispersed in the alkyd resin vehicle and coated over a black primer, a golden appearance and a pleasing lustrous iridescent sparkle are obtained, especially when viewed in the sunshine.

*Example II*

The mica used in this example is of a larger particle size than that used in Example I. It was obtained by screening the mica of the previous example and collecting the portion which passes through a 200 mesh screen and is retained on a 325 mesh screen.

100 parts of this −200/+325 mesh mica is slurried in 1160 parts of the titanyl sulfate solution of Example I, and the mixture is treated in the manner described in that example. Because of the larger particle size of the mica, the surface area per gram is less so that the same amount of titanyl sulfate produces a thicker coating on the mica flakes than was obtained in Example Ia. When the flakes are dispersed in a coating composition vehicle and coated over a black surface, a blue appearance and a pleasing lustrous sparkle are obtained.

By using the above conditions and a still larger mica flake which passes a 160 mesh screen but is retained on a 200 mesh screen, the lower surface area results in a still thicker coating of hydrous titanium dioxide. When such flakes are incorporated in a coating composition vehicle and coated over a black surface, a golden appearance and a pleasing lustrous sparkle are seen. The golden appearance obtained with this thicker layer of hydrous titanium dioxide is a second order interference color.

*Example III*

The precipitation procedure used in Examples I and II, and again in this example, coats the mica flake with a translucent layer of hydrous titanium oxide. This example illustrates further the variation in color with variation in $TiO_2$ content per unit area together with the changes which occur on calcination of the pigment to convert the hydrous oxide coating to a more light-stable translucent coating of titanium dioxide.

A number of runs were made using the quantities of titanyl sulfate solution and mica set forth in the table below. The mica and titanyl sulfate solution used were the same as those described in Example I. All quantities are in parts by weight. The mica is dispersed in the titanyl sulfate solution, and the resulting mixture is heated to the boil and boiled under reflux for 3 hours, after which time the product is isolated by filtering, washing, and drying in the manner of Example I. The dry product is then calcined in air at about 950° C. for 1 hour. Upon cooling, shiny flakes with an iridescent sparkle are obtained. In bulk form, both the calcined and uncalcined products may be described as being off-white in appearance. However, when dispersed in a liquid and observed on a dark surface, the colors given in the table are observed. These colors vary with the amount of $TiO_2$ coating on the mica flakes:

| | | | | |
| --- | --- | --- | --- | --- |
| Mica | 100 | 100 | 100 | 100 |
| Titanyl sulfate solution | 772 | 1,160 | 1,600 | 2,440 |
| Equivalent $TiO_2$ | 33 | 50 | 70 | 105 |
| Yield, uncalcined | 135 | 155 | 178 | 210 |
| Hydrated $TiO_2$/square meter in grams | 0.11 | 0.17 | 0.24 | 0.34 |
| Color | Pale gold | Dark gold | Bluish violet | 2nd order pale gold |
| Yield after calcination | 123 | 140 | 156 | 182 |
| $TiO_2$/square meter in grams | 0.085 | 0.14 | 0.19 | 0.27 |
| Color | Very pale gold | Med. gold | Golden red | Green |

From the above table, it can be seen that there is a loss in the weight of the TiO₂ coating on calcination. Such a loss is, of course, accompanied by some reduction in thickness of the film of $TiO_2$ and a change in the predominant hue of the interference colors. This change is in the direction of interference at a lower wave length, as is to be expected from thinner films. The calcined products of this example are much more light stable than the uncalcined products of Examples I and II.

*Example IV*

This example illustrates coating mica flakes using a concentrated titanyl sulfate solution of the type commonly produced during the conversion of ilmenite ore to $TiO_2$ pigment. Although such solutions usually contain some iron in divalent form, it is not precipitated along with the hydrous $TiO_2$. Instead, the iron remains dissolved as $FeSO_4$ in the mother liquor.

As set forth in detail in the table which follows, 100 parts of mica as described in Example I is slurried in the indicated amount of water and heated to about 60° C. While stirring vigorously at 60° C., the indicated amount of concentrated titanyl sulfate solution ($TiOSO_4$, calculated as $TiO_2$, 14.1%; $FeSO_4$, calculated as Fe, 3.7%; F.A., 80) also heated to 60° C., is added rapidly. The mixture is heated to the boil and boiling continued under reflux for the indicated time. The flakes are recovered by filtering, washing free of soluble salts and drying at 80° C. The slightly yellow nacreous flakes are then calcined in air at 950° C. for 1 hour to give slightly darker colored flakes which, when dispersed in coating compositions, impart the indicated colors to the compositions together with a lustrous iridescent sparkle in the sunshine.

|  | A | B |
|---|---|---|
| Mica | 100 | 100 |
| Water | 236 | 448 |
| Titanyl sulfate solution | 190 | 365 |
| Equivalent TiO₂ | 27.3 | 52.3 |
| Reflux time, hours | 2 | 2.5 |
| Yield | 130 | 165 |
| Percent hydrous TiO₂ | 23.1 | 39.4 |
| Yield after calcination | 127 | 148 |
| Percent TiO₂ | 21.4 | 35.4 |
| Color | Silver | Gold |

*Example V*

The interference color of a coated flake pigment is a function of the thickness of the coating layer thereon. Since actual measurement of this thickness is not readily done, the weight of the coating material per unit area of the surface of the substrate is a convenient index of the thickness of the coating. It is obvious that a fixed weight of coating material will produce coating of different thickness on equal weights of substrates which differ in surface area. Conversely, adjustment of the weight of substrates so that the total surface areas are equal should give equal coating and substantially equal color. The following series of samples illustrates these points using three samples of waterground white mica (muscovite) with the weights adjusted so that the total surface areas of the mica used is the same in each case.

The titanyl sulfate solution had the following composition: $TiOSO_4$, calculated as $TiO_2$, 14.1%; $FeSO_4$, calculated as Fe, 3.7%; F.A., 80. The general procedure used to coat the mica is described in Example IV. Specific details on the procedure are as follows:

SURFACE AREA AND WEIGHT OF SAMPLES

|  | Sample 1 | Sample 2 | Sample 3 |
|---|---|---|---|
| Surface area of mica, sq. meters/grams | 3.2 | 2.6 | 2.4 |
| Weight of mica used in grams | 20.0 | 24.6 | 26.7 |
| Total surface area of mica, sq. meters | 64.0 | 64.0 | 64.0 |

Treatment as follows:

|  | Sample 1 | Sample 2 | Sample 3 |
|---|---|---|---|
| a. Weight of TiOSO₄ (calc. as TiO₂), grams | 11.7 | 11.7 | 11.7 |
| Yield in grams | 29.9 | 34.2 | 36.4 |
| Weight of hydrated TiO₂ in coated flakes | 9.9 | 9.6 | 9.7 |
| Hydrated TiO₂/sq. meter of mica in grams | 0.16 | 0.15 | 0.15 |
| Interference color, all three alike | (¹) | (¹) | (¹) |
| b. Weight of TiOSO₄ (calc. as TiO₂), grams | 15.6 | 15.6 | 15.6 |
| Yield in grams | 33.1 | 37.0 | 39.9 |
| Weight of hydrated TiO₂ in coated flakes | 13.1 | 12.4 | 13.2 |
| Hydrated TiO₂/sq. meter of mica in grams | 0.20 | 0.19 | 0.21 |
| Interference color, all three alike | (²) | (²) | (²) |
| c. Weight of TiOSO₄ (calc. as TiO₂), grams | 19.5 | 20.8 | 20.8 |
| Yield in grams | 36.5 | 41.5 | 43.6 |
| Weight of hydrated TiO₂ in coated flakes | 16.5 | 16.9 | 16.9 |
| Hydrated TiO₂/sq. meter of mica in grams | 0.26 | 0.26 | 0.26 |
| Interference color, all three alike | (³) | (³) | (³) |

¹ Light gold.  ² Reddish gold.  ³ Blue.

*Example VI*

In a specific examination of the particle size of the $TiO_2$ deposted on the mica flakes, a sample of uncalcined silver colored flake pigment may be prepared according to the following procedure which differs only in minor details from sample A in Example IV above.

100 parts of water-ground white mica (specific surface 3.2 sq. meters/gram) is slurried in 1000 parts of water and the slurry heated externally to about 95° C. At this point, 290 parts of a titanyl sulfate concentrate (15% available $TiO_2$, F.A. 80) is added rapidly to the agitated slurry. The resulting slurry (temp. 89° C.) is heated to the boil and boiled 1.5 hours, cooled to 60° C., filtered, washed free of sulfate ion and dried to give 135 parts of a yellowish silver nacreous pigment. Portions of this pigment are then calcined in air at various temperatures as shown in the table below. The final flakes, after calcination, are then examined in a conventional manner in an electron microscope and the general appearance of the samples, together with an estimate of average particle size of the $TiO_2$ in the metal oxide coating, is presented in the table. Three other samples prepared in a like manner and similarly examined in the electron microscope are included in the table.

| Sample | Calcination temp., °C | General appearance | Particle Size (microns) |
|---|---|---|---|
| This example | (¹) | Indefinite particles, very small. | (²) |
| Do | 700 | Uniform discrete particles | 0.025 |
| Do | 900 | ----do---- | 0.04 |
| Do | 1,000 | ----do---- | 0.09 |
| Do | ³ 1,100 | Many lath-like particles of non-uniform sizes. | >0.10 |
| Sample A | 950 | Discrete particles | 0.08 |
| Sample B | 900 | ----do---- | 0.03 |
| Do | 950 | ----do---- | 0.07 |
| Sample C | 850 | ----do---- | 0.04 |
| Do | 950 | ----do---- | 0.07 |

¹ Uncalcined.  ² Not measurable.
³ It should be noted that at temperatures of about 1100° C. and above the mica begins to decompose and the crystal growth of TiO₂ becomes much more rapid.

*Example VII*

This example illustrates the use of an organic titanate to apply a titanium oxide layer to the mica flakes.

Approximately 1 gram of muscovite mica flakes with largest dimensions of about 100 microns and with a thickness of 1–2 microns is spread in a thin layer inside a 1-inch "Vycor" tube. The tube is evacuated by means of a vacuum pump attached to one end of the tube, the other end of the tube being attached through a closed valve to a reservoir of tetraisopropyl titanate contained in a glass flask. The tube and flask contents are heated, with maintenance of the vacuum, to 600° C., at which temperature the valve between the tube and the organic titanate container is opened permitting the titanate vapors to pass into the hot tube. After approximately 30 minutes, the valve is closed and the tube and contents are cooled to room temperature under vacuum. After cooling, the vacuum is disconnected and the coated flakes are removed from the tube. The flakes obtained exhibit a variety of interference colors and when they are dispersed in a cellulose acetate film, they impart a nacreous appearance thereto.

*Example VIII*

This example illustrates improving the light stability of the hydrous titanium dioxide coating by applying an outer coating of hydrous aluminum oxide on the $TiO_2$-coated mica flakes.

100 parts of the yellowish-white flakes of Example Ia is neutralized by slurrying in an excess of dilute aqueous ammonia. It is then filtered, washed, dried, if desired, and reslurried in 4000 parts of an aqueous solution containing 200 parts of $Al_2(SO_4)_3 \cdot 18H_2O$ and 80 parts of sodium acetate. The slurry is heated to 90° C. and then held in the temperature range of 90° C.–100° C. for about 30 minutes. The slurry is filtered hot, washed with hot water until free of sulfates, and dried at about 60° C. to give a powder containing about 6% alumina (as $Al_2O_3$). This powder is more yellowish than the starting material, and when it is dispersed in an alkyd coating composition, such as Formulation D, and applied over a black primer, a dark golden nacreous appearance and a lustrous iridescent sparkle are obtained. When tested in a "Fade-Ometer," a cellulose acetate film (as in Formulation A) pigmented with these flakes shows a marked superiority in light stability over the untreated counterpart.

*Example IX*

This example illustrates a still further improvement in light stability by applying a layer of hydrous aluminum oxide to a calcined $TiO_2$-coated mica flake pigment.

100 parts of the calcined product of Example III resulting from the use of 100 parts of mica and 772 parts of titanyl sulfate solution is mixed with 200 parts of an aqueous solution containing 20 parts of $Al_2(SO_4)_3 \cdot 18H_2$. A 5% solution of sodium carbonate is then added slowly, while stirring, until the pH is 7.0. The flake pigment is then isolated by filtering, washed free of soluble salts, and dried. The product obtained is substantially unchanged with respect to sparkle and overall silvery gold appearance when dispersed in a coating composition vehicle and applied over a black surface. On the other hand, it exhibits a notable improvement in lightfastness. Cellulose acetate films containing the pigment show no change upon exposure in an Atlas "Fade-Ometer" for 1000 hours.

*Example X*

This example illustrates the use of synthetic phlogopite as the micaceous flake substrate.

20 parts of synthetic phlogopite of such particle size that all of it passes through a 160 mesh screen and is retained by a 200 mesh screen, is added at room temperature (approximately 25° C.) to 600 parts of aqueous titanyl sulfate solution containing 24 parts of titanyl sulfate calculated as $TiO_2$ and F.A. of 217. The mixture is stirred and diluted with 600 parts of water and then heated to 80° C. during one hour and maintained at 70–80° C. with vigorous stirring. Portions of the slurry are removed from time to time and placed in a pool of water on a black surface for determination of color. After approximately 1½ hours at 70–80° C. a blue color is evident. On continued stirring to a total of 3 hours, the color of samples taken during the stirring period becomes successively gold, red, blue, green, gold (again), red (again), and then, finally, green. The slurry is then filtered, and the filter cake is washed with water until the effluent wash water gives a negative test for sulfate ion. The filter cake is then washed with acetone and allowed to dry. The final product is a flake pigment having a predominant green hue and a lustrous iridescent sparkle when dispersed in an alkyd resin and viewed in the sunshine.

*Example XI*

This example illustrates the application of a hydrous zirconium oxide to mica flakes.

100 parts of the mica described in Example I is slurried in 2000 parts of an aqueous solution containing 200 parts of $Zr(SO_4 \cdot 4H_2O)$ and previously adjusted to a pH of 2.8 by adding urea thereto. The slurry is heated to 90° C. and held near this temperature for about 2 hours with good agitation throughout. The solid product is recovered by filtering, washed, and dried, and it is then calcined for 1 hour at 700° C. in air to give a flake pigment having a silver appearance and a pleasing lustrous sparkle when dispersed in a coating composition vehicle.

*Example XII*

This example illustrates the application of a layer of hydrous zinc oxide to mica flakes which have been previously coated with $TiO_2$.

The procedure of Example Ia is followed to produce $TiO_2$-coated mica flakes and, prior to drying, 30 parts of these flakes is slurried in 2200 parts of 3% aqueous ammonium hydroxide solution at room temperature. The mixture is stirred at room temperature for 30 minutes, and then filtered. The presscake is washed with water until the pH of the effluent wash water is 8, and then dried in an oven at 80° C. 25 parts of the dried flakes is added at room temperature to a solution formed as follows: 10 parts of $ZnCl_2$ is dissolved in 500 parts of water, and amonium hydroxide is then added to the solution with vigorous stirring until the precipitate initially formed redissolves. The slurry is heated to approximately 80° C. and maintained at about that temperature for about 2 hours to drive off ammonia from the solution. After the heating, the slurry is filtered and the presscake is washed free of soluble chlorides and dried at about 80° C. The product obtained has much the same appearance as the product of Example Ia. Analysis indicated the presence of 19% zinc, calculated as zinc oxide. Lightfastness of the zinc-treated product is appreciably superior to that of the corresponding product without the zinc treatment. Calcination of this zinc-containing product yields a flake pigment in which the $TiO_2$ is present predominantly in the rutile form, whereas in the corresponding calcined flake product which is not zinc-treated, the $TiO_2$ is predominantly in the anatase structure.

*Example XIII*

This example illustrates the application of a layer of hydrous zirconium oxide to mica flakes which have been previously coated with $TiO_2$.

A $TiO_2$-coated mica flake pigment exhibiting a golden color when observed on a black surface is prepared as follows: 108 parts of water-ground muscovite mica with a surface area of 3.1 square meters per gram is slurried in 600 parts of water. The slurry is heated to the boil, and 351 parts of a 20% (as $TiO_2$) titanyl sulfate solution (F.A. 80) is added to the boiling slurry. Heating is continued, and the mixture is refluxed for 3 hours and allowed to cool overnight before filtering. After filtering, the presscake is washed with approximately 12,000 parts of water at room temperature, then washed with about 500 parts of a 2% ammonium hydroxide solution, and finally washed with 6000 parts of water. After drying the presscake overnight at 80° C., 164 parts of flake pigment is obtained, containing approximately 34% of hydrous titanium oxide. When dispersed in a coating composition vehicle, these flakes exhibit a reddish gold color which is more pronounced over a dark surface.

50 parts of these golden flakes is then overcoated with hydrous zirconium oxide as follows: 7.5 parts of $Zr(SO_4) \cdot 4H_2O$ is dissolved in 500 parts of water, and urea is then added slowly to the solution with good stirring to bring the pH to 2.0. 50 parts of the golden flakes is added to the solution, the resulting slurry is heated to the boil and held at the boil under reflux for 1 hour. On heating, the initial golden color of the flakes gradually changes to a purple. Addition of more of the zirconium sulfate-urea solution and further heating results in a second order gold color to the flakes. The slurry is then filtered, and the solid is washed free of sulfate and dried to give a pigment which exhibits a golden color when dispersed in a coating composition vehicle and applied over a black surface. Accelerated lightfastness tests show the zirconium-coated flakes to be appreciably better in lightfastness than the uncoated counterpart. They contain about 7.7% zirconium oxide (as $ZrO_2$).

The following Examples XIV to XVII, inclusive, are based upon the use of $TiO_2$-coated mica flakes, made after the general procedure of Example IV, which are further coated with a second metal oxide as shown in the details. In these examples, two different samples are shown; one of these samples (flake A) is an uncalcined silver-colored flake containing about 20.7% $TiO_2$. This product was prepared by treating 100 parts of the mica described in Example I with 233 parts of a titanyl sulfate concentrate containing 15% $TiO_2$ (F.A. about 80) (which is equal to 35 parts $TiO_2$). The procedure used is according to Example IV and about 126 parts of flake are obtained. Prior to drying, the residual sulfuric acid is neutralized by slurrying in an excess of dilute ammonia, filtering, and washing. The second sample (flake B) is a yellowish silver-colored flake containing about 26.2% $TiO_2$ made in a like manner from 100 parts mica described in Example I and 290 parts titanyl sulfate concentrate (F.A. about 80) containing 15% $TiO_2$, which is equal to 43.5 parts $TiO_2$.

In Examples XIV through XVIII, the term "reflex color" is used to describe the color observed at the specular angle, usually contrasting with the inherent color. In this use, it is a convenient means of distinguishing the interference color from the inherent color of metal oxide coatings.

Example XIV

This example and Example XIVa illustrate the application of a layer of chromium oxide to mica flakes which have been previously coated with $TiO_2$.

$Cr(NH_3)_6Cl_3$ is prepared by dissolving 40 parts of $CrCl_3$ in liquid ammonia and allowing the excess ammonia to evaporate. The light green product thus obtained is dissolved in 2000 parts of water and then 100 parts of $TiO_2$-coated mica (flake A) is added with stirring. The slurry is heated to the boil and refluxed for about 4 hours until the green color of the solution is no longer evident. The product is then isolated by filtering, washed with water, and dried. The flake pigment product is light green in color, and at the same time this green color exhibits a silvery reflex.

On calcination at 950° C. the green color becomes somewhat less intense, but the silver reflex is retained. This product, containing chromium oxide equivalent to 3.04% Cr, is markedly more lightfast than the untreated flake A.

Example XIVa 100 parts of yellowish silver flake B (26.2% $TiO_2$) is slurried in a solution of 40 parts chromium sulfate $(Cr_2(SO_4)_3 \cdot 5H_2O)$ in 1000 parts of water at about 50° C. Borax $(Na_2B_4O_7 \cdot 10H_2O)$ is then added in small increments of about 2 parts each until a constant pH of 5.5 to 6.0 is reached and maintained for at least 15 minutes. The resulting product is isolated by filtering, washed sulfate free, and dried. After calcination for ½ hour at 900° C., the flakes are greenish gold in color with a golden reflex, and they exhibit excellent lightfastness in the cellulose acetate film of Formulation A.

Example XV

This example and Example XVa illustrate the application of a layer of iron oxide to mica flakes which have been previously coated with $TiO_2$.

400 parts of silver-colored flake A (20.7% $TiO_2$) is added to a solution of 50 parts ferric chloride ($FeCl_3$) and 80 parts of sodium acetate ($NaC_2H_3O_2$) in 1000 parts of water at 25° C. The slurry is heated with agitation to 80° C. and stirred for one hour at 80° C. until the mother liquor is substantially colorless. A further portion of solution containing 50 parts ferric chloride and 80 parts sodium acetate in 1000 parts of water is then added. The mixture is heated for one hour at 80° C., after which time another 50 parts of ferric chloride and 80 parts of sodium acetate in 1000 parts of water is added, and the whole mixture is heated for one hour at 80° C. The slurry is filtered washed, and dried to give yellowish-brown flakes having a golden reflex. Upon calcination at 400° C, 600° C., and 900° C., the pigment being maintained at each temperature for ½ hour, the golden reflex does not change but the overall color changes to brown at 400° C., to reddish brown at 600° C., and to a brilliant golden brown at 950° C.

Example XVa 100 parts of the yellowish silver flake B (26.2% $TiO_2$) is added to 600 parts of a 11.4% $FeCl_3$ solution (68 parts $FeCl_3$) and 60 parts of sodium acetate ($NaC_2H_3O_2$) is added with agitation. After the sodium acetate is dissolved, the slurry is heated to 80° C. and maintained at that temperature for several hours with frequent examination of a diluted drop of the slurry on a black surface. The overall color of the flakes is golden yellow, and the colored sparkle or reflex color progresses with continued heating through gold to red, to purple, and finally to green, while the overall golden color remains substantially unchanged. Samples are taken when each of the various colors is observed, and these samples are filtered, washed, and dried, and analyzed for iron. This analysis indicates the following iron content:

| | Percent Fe |
|---|---|
| Red reflex color | 8.9 |
| Purple reflex color | 11.0 |
| Green reflex color | 16.4 |

These samples, in addition to possessing the unusual color effects described above, show marked improvements in lightfastness as compared with the original $TiO_2$-coated flakes.

Example XVI

This example and Example XVIa illustrate the application of a layer of nickel oxide to mica flakes which have been previously coated with $TiO_2$.

100 parts of silver-colored flake A is added to a solution prepared by dissolving 200 parts of nickel chloride ($NiCl_2 \cdot 6H_2O$) and 500 parts of sodium acetate ($NaC_2H_3O_2$) in 2400 parts of water. The resulting slurry is heated to the boil and kept at the boil for approximately 4 hours until the flakes become light green in color. The product is then filtered, washed chloride free, and dried at about 60° C. The dried material is a light green color with a sparkling silver appearance. A portion of the dried flakes is calcined by heating to 950° C. and maintaining the flakes at this temperature for 30 minutes. The calcined product has a bright yellow color with a sparkling golden reflex. It contains 3.5% Ni. When dispersed in a vinyl composition (as in Formulation D) a particularly pleasing golden nacreous effect is obtained.

Example XVIa

An ammoniacal nickel chloride solution is prepared by dissolving 24 parts nickel chloride ($NiCl_2 \cdot 6H_2O$) in 2000 parts of water and adding concentrated ammonium hydroxide solution with constant stirring until a precipitate is formed and then redissolved. 1000 parts of silver-colored flake A (20.7% $TiO_2$) is added, the slurry heated to the boil and maintained at the boil under reflux for about 4 hours. It is then filtered, washed free of chlorides, and dried to give light green colored flakes with a silver reflex, showing a marked improvement in light stability over the untreated silver flakes.

Example XVII

This example illustrates the application of a layer of cobalt oxide to mica flakes which have been previously coated with $TiO_2$.

100 parts of silver-colored flake A is added with stirring to a solution at room temperature prepared by dissolving 200 parts of cobalt chloride hexahydrate ($CoCl_2 \cdot 6H_2O$) and 300 parts of sodium acetate in 2000 parts of water. The resulting slurry is heated to the boil and kept under reflux for one hour. The slurry is then filtered hot and the presscake is washed with water until chloride free. The presscake is dried in an oven at about 80° C. The dried flakes, when dispersed in cellulose acetate as described in Formulation A produce a dry film having a grap metallic nacreous appearance. Calcination of the flakes for one hour at 950° C. results in a light green product having a silver reflex color. The product contains 2.9% Co.

Example XVIII

This example illustrates the application of a layer of copper oxide to mica flakes which have been previously coated with $TiO_2$.

100 parts of silver-colored flake A is added to an ammoniacal copper chloride solution prepared by dissolving 20 parts of copper chloride ($CuCl_2$) in 1000 parts of water and then adding ammonium hydroxide (28% $NH_3$) until a precipitate is formed and then redissolved. The slurry is gently heated at about 60° C. for one hour to drive off ammonia and precipitate a hydrous copper oxide on the mica. The flake product is then isolated by filtering, washed free of dissolved salts, and dried. The product consists of grayish flakes with a silver reflex. Calcination of a portion of the product at 950° C. for 15 minutes gives a darker gray-black product retaining the silver reflex and containing 2.4% Cu.

Example XIX

COPRECIPITATION WITH CHROMIUM OXIDE 40 parts of chromic sulfate ($Cr_2(SO_4)_3 \cdot 5H_2O$) is dissolved in 1000 parts of water to which is added 100 parts of water-ground white mica (Concord #300/325) and the slurry is heated, while well stirred, to 90–100° C. 490 parts of titanyl sulfate concentrate ($TiO_2$ equivalent 14.4%, F.A. 80) is then added rapidly, the slurry is reheated rapidly to the boil and maintained under reflux for about 3 hours. The product is filtered, washed free of soluble salts and dried to give greenish flakes with a reddish gold reflex color. On calcination at about 900° C, the product is transformed to yellow nacreous flakes with a brilliant gold reflex color. Coating compositions containing this pigment exhibit excellent lightfastness.

Example XX

COPRECIPITATION WITH IRON OXIDE 100 parts of Conord Water Ground Mica #200/325 is slurried in 920 parts of a titanyl sulfate solution ($TiO_2$ equivalent 4.15% F.A. 220) into which is dissolved 20 parts of anhydrous ferric sulfate. The slurry is thoroughly agitated and heated to 95–100° C. in about 30 minutes and held at that temperature for about 4 hours. Samples of the slurry taken during the heating period and diluted with water on a black surface show a progressive change in the color of the mica flakes suspended therein. The final pigment is filtered, washed free of soluble salts and calcined for one hour at 900° C. to give a yellow nacreous flake pigment which produces a strongly golden color in a coating composition. Such compositions exhibit a very high degree of lightfastness.

Example XXI and XXII

The following examples illustrate the use of mixtures of the new nacreous flake pigments with conventional colored pigments to obtain highly attractive decorative effects.

(Example XXI)

ACRYLIC LACQUERS WITH MIXTURES OF PIGMENTS

These lacquers are based upon a vehicle blend consisting of

| | Percent |
|---|---|
| Mixed acrylic ester polymer (Acryloid A–101) | 85.4 |
| Butyl benzyl phthalate (as plasticizer) | 14.6 | and a solvent blend consisting of

| | Percent |
|---|---|
| Monoacetate of ethylene glycol monoethyl ether | 20 |
| Methyl ethyl ketone | 30 |
| Toluene | 50 |

A copper phthalocyanine (CPC) blue acrylic lacquer (made in a conventional manner in a ball mill) consists of

| | Parts |
|---|---|
| Copper phthalocyanine blue | 3.2 |
| Vehicle blend | 66.2 |
| Solvent blend | 30.6 |

The following mixed lacquers are then made:

| | A, parts | B, parts |
|---|---|---|
| Silver flake pigment (Example Va) | 4.75 | 4.75 |
| Vehicle blend | 97.0 | 97.0 |
| CPC blue lacquer | 7.8 | 1.6 |
| Solvent blend | 21.7 | 21.7 |

The ingredients are thoroughly blended by high speed agitation for 15 minutes, thinned with additional solvent blend to spraying consistency and sprayed with 3 double coats on a suitable panel.

In lacquer A, the silver flake/blue ratio is 95/5 and the resulting panel exhibits a highly pleasing "metallized" effect with a more pronounced sparkle than usually exhibited by lacquers containing aluminum flake. The effect is obtained over a fairly wide range of flake/color ratios up to as much as about 50/50.

In lacquer B, the silver flake/blue ratio is 99/1 and the resulting panel exhibits the effect of a bluish toned pearl with a brilliant iridescent sparkle under bright illumination.

(Example XXII)

ALKYD ENAMEL WITH A MIXTURE OF PIGMENTS

A polychloro copper phthalocyanine green (CPC green) enamel of the following composition is prepared by dispersion in a ball mill in the conventional manner

| | Parts |
|---|---|
| CPC green pigment | 5.0 |
| Non-oxidizing coconut oil-modified alkyd resin solution (16% solids) | 42.6 |
| Modified melamine formaldehyde resin (55% solids) | 20.0 |
| Aromatic hydocarbon solvent | 16.2 |
| Aliphatic hydrocarbon solvent | 16.2 |

A portion of this enamel is mixed with a nacreous flake pigment as follows:

| | Parts |
|---|---|
| Gold flake pigment (Example Vb) | 4.75 |
| CPC green enamel | 5.00 |
| Non-oxidizing coconut oil-modified alkyd resin solution (60% solids) | 58.4 |

These ingredients are mixed for 5 minutes by high speed agitation after which 27.2 parts of modified melamine formaldehyde resin (55% solids) is added and high speed agitation is continued for 5 minutes. The enamel is then reduced to spraying consistency with a 50/50 aromatic/aliphatic hydrocarbon mix and sprayed with 3 double coats onto a suitable panel. This enamel contains a gold flake/CPC green ratio of 95/5 and the color is much yellower than that of the CPC green enamel alone. In addition, the panels exhibit a lustrous golden sparkle.

The pigments described in the foregoing specification offer the following notable advantages:

(1) They can be prepared and marketed as dry pigments.

(2) These dry pigments show a remarkable ease of dispersion in the compositions in which they are used.

(3) They show a nacreous effect of a degree not readily produced with prior art nacreous pigments.

(4) They show an iridescent sparkle with a pronounced predominant hue which may be varied at will by simple alterations in the compositions.

(5) When properly stabilized, they offer a high degree of lightfastness.

(6) They exhibit substantial freedom from toxicity.

(7) They are chemically stable and do not contribute to water spotting of surface finishes with compositions containing them.

(8) They are heat stable and can be used in baking enamels and in plastics processed at high temperature.

(9) They are completely non-bleeding in solvents and in the usual chemical agents to which coating compositions may be subjected.

(10) They are compatible with coating composition vehicles and plastic systems.

(11) They make possible tinctorial effects not heretofore obtainable.

Since it is obvious that many changes and modifications can be made in the above-described details without departing from the nature and spirit of the invention, it is to be understood that the invention is not to be limited to said details except as set forth in the appended claims.

The embodiments of the invention in which an exclusive property or privilege is claimed are defined as follows:

1. A pigment composition consisting essentially of translucent micaceous flakes having on the surface thereof a translucent layer of metal oxide particles consisting essentially of particles selected from the group of hydrous titanium dioxide particles, titanium dioxide particles, hydrous zirconium dioxide particles, and zirconium dioxide particles, substantially all of which are less than 0.1 micron in particle size, said layer having a thickness of about 20–250 millimicrons, said pigment being silver color when the thickness of metal oxide layer is in the lower portion of said range and exhibiting various colors of the spectrum as the thickness of the metal oxide layer is increased.

2. The composition of claim 1 in which the thickness of the metal oxide layer is 20–155 millimicrons.

3. The pigment composition of claim 1 wherein the micaceous flakes are white mica flakes having a specific surface area of 2–7 square meters per gram.

4. A pigment composition consisting essentially of translucent micaceous flakes having on the surface thereof translucent, successive layers of metal oxides, the first layer being a layer of a metal oxide from the group consisting of hydrous titanium dioxide particles, titanium dioxide particles, hydrous zirconium dioxide particles, and zirconium dioxide particles, substantially all of which are less than 0.1 microns in particle size, the weight of the metal oxide in said first layer being about 10–66% by weight of the total pigment, and on top of said first layer at least one layer of a different metal oxide from the group consisting of $TiO_2$, $ZrO_2$, $Al_2O_3$, $ZnO$, $Sb_2O_3$, $SnO_2$, $Fe_2O_3$, $CuO$, $NiO$, $CoO$, and $Cr_2O_3$, and the hydrous forms of these oxides, said different metal oxide being in the form of particles substantially all of which are less than 0.1 micron in particle size, the amount of said metal oxide being 0.5 to 20% by weight of the metal oxide in the first layer.

5. The pigment composition of claim 4 wherein the first layer is titanium dioxide and on top of said layer of titanium dioxide is a layer of $Cr_2O_3$.

6. The pigment composition of claim 4 wherein the first layer is titanium dioxide and on top of said layer of titanium dioxide is a layer of $Fe_2O_3$.

7. The pigment composition of claim 4 wherein the first layer is titanium dioxide and on top of said layer of titanium dioxide is a layer of $NiO$.

8. The pigment composition of claim 4 wherein the first layer is titanium dioxide and on top of said layer of titanium dioxide is a layer of $Al_2O_3$.

9. A pigment composition consisting essentially of a translucent micaceous flake substrate having on the surface thereof a translucent layer consisting essentially of a colorless metal oxide selected from the group of titanium dioxide, zirconium dioxide, and the hydrated forms thereof, said composition being a colored nacreous flake pigment exhibiting, under bright illumination, a lustrous sparkle with a predominant color varying, with increasing thickness of the metal oxide layer, from silver to gold to red to blue to green.

10. The composition of claim 9 having deposited on the surface thereof a translucent layer of a second metal oxide.

11. A pigment composition consisting essentially of translucent micaceous flakes having on the surface thereof a translucent layer of metal oxide particles, the major amount of said metal oxide particles being a metal oxide from the group consisting of titanium dioxide, zirconium dioxide, and the hydrous forms thereof wherein substantially all of said particles are less than 0.1 micron in particle size and the amount of said oxide is 10–66% by weight of the total pigment, and intermingled therewith a minor amount of different metal oxide particles in which the metal oxide is selected from the group consisting of $TiO_2$, $ZrO_2$, $Al_2O_3$, $ZnO$, $Sb_2O_3$, $SnO_2$, $Fe_2O_3$, $CuO$, $NiO$, $CoO$, $Cr_2O_3$, and the hydrous forms thereof, said different metal oxide being in the form of particles substantially all of which are less than 0.1 micron in particle size, the amount of said metal oxide being 0.5 to 20% by weight of the metal oxide present in the major amount.

12. The pigment composition of claim 11 in which titanium dioxide constitutes the major amount of the metal oxide layer and $Cr_2O_3$ constitutes the minor amount of the metal oxide layer.

13. The pigment composition of claim 11 in which titanium dioxide constitutes the major amount of the metal oxide layer and $Fe_2O_3$ constitutes the minor amount of the metal oxide layer.

14. A pigment composition consisting essentially of white mica flakes having on the surface thereof a translucent layer of titanium dioxide particles substantially all of which are less than 0.1 micron in particle size, said layer having a thickness of 20–90 millimicrons, said pigment being of a silver color when the thickness of the metal oxide layer is in the lower portion of said range and progressing to a gold color as the thickness of the metal oxide layer is increased.

15. The composition of claim 9 wherein the colorless metal oxide is titanium dioxide.

References Cited in the file of this patent

UNITED STATES PATENTS

| | | |
|---|---|---|
| 834,739 | Lillienfeld | Oct. 30, 1906 |
| 2,332,220 | Harshberger | Oct. 19, 1943 |
| 2,941,895 | Haslam | June 21, 1960 |
| 2,995,459 | Soloway | Aug. 8, 1961 |
| 3,008,844 | Grunin et al. | Nov. 14, 1961 |